United States Patent [19]
Kienberger

[11] Patent Number: 5,872,785
[45] Date of Patent: Feb. 16, 1999

[54] METHOD FOR SWITCHING NARROWBAND PARTIAL LINE BUNDLES BETWEEN COMMUNICATIONS SYSTEMS VIA AN ATM COMMUNICATION NETWORK

[75] Inventor: Helmut Kienberger, Munich, Germany

[73] Assignee: Siemens Aktiengesellschaft, Munich, Germany

[21] Appl. No.: 716,542

[22] Filed: Sep. 19, 1996

[30] Foreign Application Priority Data

Sep. 19, 1995 [DE] Germany .................. 195 34 754.4

[51] Int. Cl.⁶ ............................................ H04L 12/28
[52] U.S. Cl. ...................... 370/395; 370/397; 370/378
[58] Field of Search ................................ 370/373, 376, 370/377, 465, 466, 395, 397, 398, 321, 337, 345, 442, 468, 471

[56] References Cited

U.S. PATENT DOCUMENTS

| | | | |
|---|---|---|---|
| 5,144,619 | 9/1992 | Munter | 370/398 |
| 5,428,607 | 6/1995 | Hiller et al. | 370/399 |
| 5,457,684 | 10/1995 | Bharucha et al. | 370/395 |
| 5,504,742 | 4/1996 | Kakuma et al. | 370/426 |
| 5,568,475 | 10/1996 | Doshi et al. | 370/426 |
| 5,577,037 | 11/1996 | Takatori et al. | 370/395 |
| 5,592,477 | 1/1997 | Farris et al. | 370/396 |
| 5,623,491 | 4/1997 | Skoog | 370/466 |
| 5,661,725 | 8/1997 | Buck et al. | 370/377 |

FOREIGN PATENT DOCUMENTS 41 32 518 C2   1/1993   Germany .

*Primary Examiner*—Dang Ton
*Assistant Examiner*—Phirin Sam
*Attorney, Agent, or Firm*—Hill & Simpson

[57] ABSTRACT

Message and signaling information (ni, si) of partial line bundles (TLB1..3) of a line bundle (LB) of a communication system (KS1..3), which line bundle have a central signaling channel (CCS), are switched to additional communication systems (KS1..3) via an ATM communication network (KN). The message information and signaling information (ni, si) are allocated cell-by-cell to virtual channels (VC1..34) of a virtual path (VP1..3) representing a partial line bundle (TLB1..3). The signaling information (si) transmitted in the central signaling channel (CCS) is separated according to partial line bundles, and, after the switching via the ATM communication network (KN), is inserted into the central signaling channel (CCS) of an additional line bundle (LB).

16 Claims, 1 Drawing Sheet

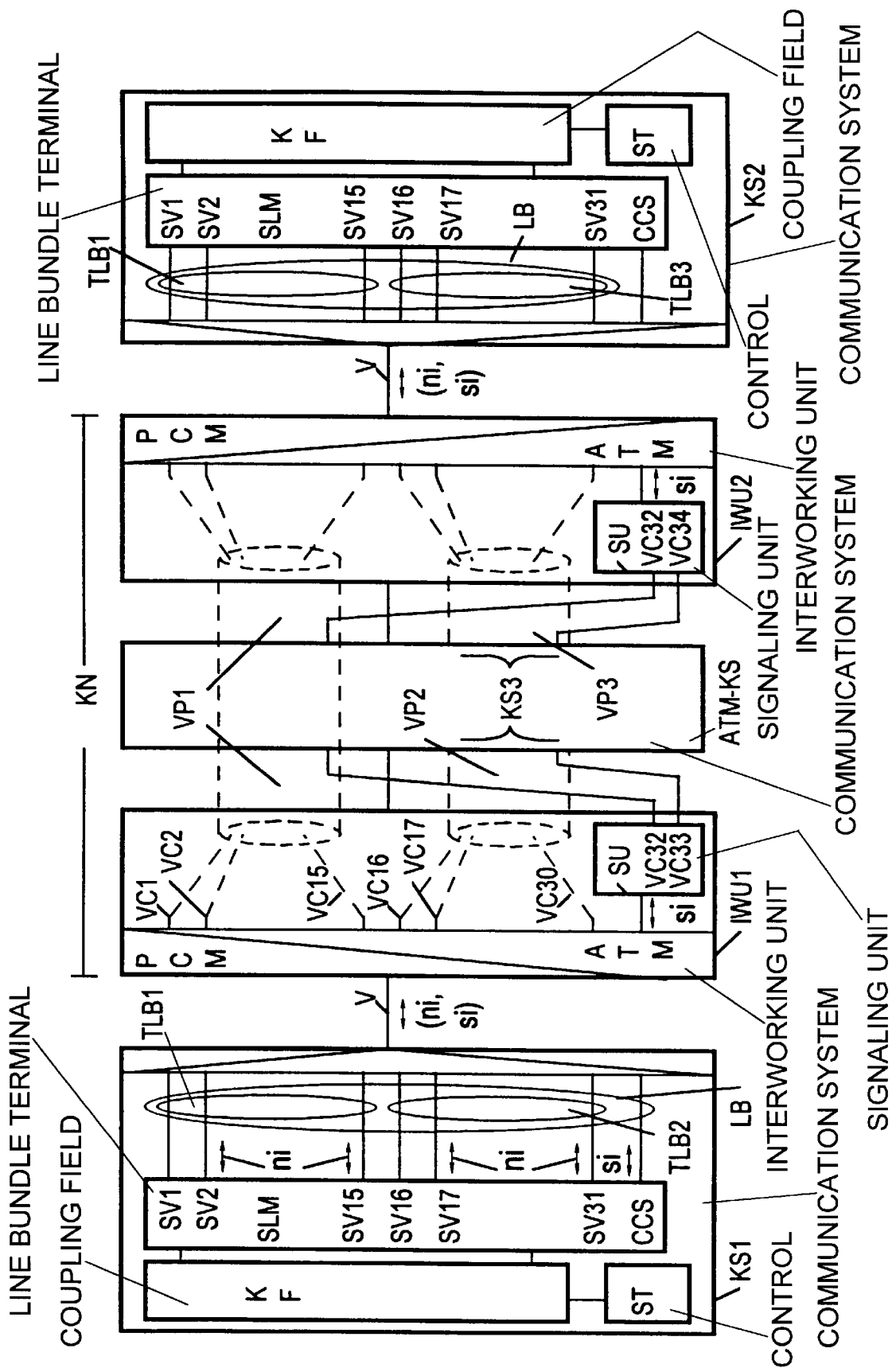

METHOD FOR SWITCHING NARROWBAND PARTIAL LINE BUNDLES BETWEEN COMMUNICATIONS SYSTEMS VIA AN ATM COMMUNICATION NETWORK

BACKGROUND OF THE INVENTION

Current communication systems that switch according to the time division multiplex method, in particular narrowband switching equipment, are connected with one another via individual narrowband fixed connections or narrowband line bundles. Narrowband connections represent in particular PCM-oriented connections, that is, digitized telephone connections or connections that transmit digital information with a transmission speed of up to 64 kbit/s. Narrowband line bundles are formed through multiplexing of the message and signaling information of several narrowband connections, whereby standardized line bundles comprise 24 or 30 narrowband connections and a transmission speed of 1544 kbit/s or 2048 kbit/s. The signaling for the multiplexed narrowband connections is transmitted in an additional narrowband connection, generally known as a central signaling channel. The individual narrowband connections or line bundles provided between the communication systems are switched via fixed connections provided by public or private network operators.

In the future, communication networks operating according to the asynchronous transfer mode (known to those skilled in the art as ATM communication systems) are provided for the switching or, respectively, transmission of the message and signaling information of line bundles in particular. For this purpose, it has been proposed in the relevant standardization committee (ATM Forum) in a CES (circuit emulation service) standard to insert the combined message and signaling information of line bundles into cells and to switch them transparently via permanent virtual connections of an ATM communication network. The cells provided for a switching in a communication network comprise a cell head (header) having 5 bytes, and a use part (payload) having 48 bytes. The message information to be switched is inserted into the payload using intermediate memories. The header contains in particular the routing information, the virtual channel and path information and the call reference number. Using the routing information, the cells are switched via the ATM communication systems of the ATM communication network. A switching of individual narrowband connections from a line bundle via the ATM communication network to different communication systems is not provided.

SUMMARY OF THE INVENTION

It is an object of the present invention to provide switch narrowband connections of a line bundle of a communication system via ATM communication networks to different additional communication systems.

An important aspect of the inventive method is that in the communication systems the message information of the relevant narrowband connections is already allocated to predetermined partial line bundles of the line bundle, are packed cell by cell, and is respectively allocated to virtual channels of a path of a permanent virtual connection or switched permanent virtual connection, which path respectively represents a partial line bundle. The combined signaling information is separated according to partial line bundles, and is respectively allocated to the relevant virtual path representing a partial line bundle.

After the transparent cell-by-cell transmission via the virtual channels of the permanent virtual paths of the ATM communication network, the message and signaling information is unpacked and allocated to the respective narrowband connections of the relevant installed partial line bundle of the line bundle that is connected with a respective additional communication system.

Advantages of the inventive method are that by means of the flexibility in the formation and switching of the partial line bundles, the switching-oriented resources of the time division multiplex communication systems and of the ATM communication network are maximally utilized. The flexibility in the formation of the partial line bundles is achieved in that both the message information and the signaling information of the partial line bundles installed by means of the respective time division multiplex communication system can be switched in the ATM communication network according to partial line bundles, that is, with an adapted bit rate.

According to an advantageous development of the inventive method, the message and signaling information are switched via virtual channels of permanent virtual paths and/or of switched permanent virtual paths of the ATM communication network. With the use of switched permanent virtual paths or, respectively, connections, the switching-oriented resources of the ATM communication network are used the most efficiently, since these are withdrawn only given a transmission of message and signaling information to the ATM communication network. In principle, permanent virtual connections (also switched ones) are set by means of administrative inputs in the ATM communication network, that is, the virtual channels of the respective virtual path of the partial line bundle are fixedly installed by means of administrative inputs. During the installation, the required scope of the quantity of information to be transmitted is requested for the individual virtual channels and paths by means of the indication of bit rates in the ATM communication network. The permanent and the switched permanent connection are distinguished by the type of switching, and thereby in the type of claim made on the switching-oriented resources of the ATM communication network. For the switched permanent virtual connection, the switching-oriented resources are first made available upon a provided transmission of information.

According to a further construction of the inventive method, the signaling information concerning a partial line bundle are combined and allocated to a separate virtual channel, which is combined with the virtual path representing the respective partial line bundle. By means of this combining of the signaling information relevant to the partial line bundle and its insertion into an additional virtual channel that is allocated to the virtual path that represents the respective partial line bundle, the switching of the respective signaling information is possible with the most minimal switching-oriented resources of the ATM communication network, since the bit rate required for the transmission of the signaling information can be individually adapted or, respectively, adjusted to the quantity of information that is actually to be transmitted.

BRIEF DESCRIPTION OF THE DRAWING

The features of the present invention which are believed to be novel, are set forth with particularity in the appended claims. The invention, together with further objects and advantages, may best be understood by reference to the following description taken in conjunction with the accompanying drawing, and in which:

The single FIGURE depicts the method of the present invention.

DESCRIPTION OF THE PREFERRED EMBODIMENT

The single FIGURE shows two communication systems KS1, KS2, and a third communication system is indicated by the designation KS3. In each of the communication systems KS1 . . . 3 operating according to the time division multiplex method, line bundle terminal installations SLM are provided, respectively connected with a coupling field KF controlled by a control installation ST. Narrowband communication terminal apparatus (not shown) are connected to the communication systems KS1 . . . 3, by means of which apparatus narrowband connections with a transmission speed of 64 kbit/s are set up either internally, that is, within the respective communication system KS1 . . . 3, or externally, that is, narrowband connections to an additional communication system KS1 . . . 3. Using the evaluation of the signaling information transmitted by the narrowband communication terminal equipment, it is determined whether an internal or an external switching of the narrowband connections is to be carried out. The internal switching is without significance for the inventive method, and is not further discussed here.

Let it be assumed for the exemplary embodiment that between the first and second communication systems KS1, KS2 15 narrowband connections SV1 . . . 15 are provided, forming a first partial line bundle TLB1, and for the switching to the third communication system KS3 15 additional narrowband connections SV15 to SV30 are provided, forming a second partial line bundle TLB2. For these 30 narrowband connections SV1 . . . 30, a common signaling channel CCS is provided, via which the signaling information si are transmitted in a packet-oriented manner. The signaling messages required for this are for example realized according to the central character channel for ISDN connections. Alternatively, standard expanded signaling protocols can be implemented between private communication systems. Message information ni (for example, digitized speech information) is transmitted via the 30 narrowband connections SV1 . . . 30. The first and second partial line bundle TLB1 . . . 2 and the central signaling channel CCS form the line bundle LB, which is represented by a single connection V with a transmission speed of 2048 kbit/s. The narrowband connections SV1 . . . 30, as well as the central signaling channel CCS (respectively a transmission speed of 64 kbit/s) are hereby multiplexed to a sum bit stream of 2048 kbit/s (not shown) and are guided via a single connection V to an interworking unit IWU. The narrowband connections SV1 . . . 30 and the central character channel CCS are bidirectionally realized, that is, have both transmission directions (incoming and outgoing).

In the interworking unit IWU1, the PCM-oriented message and signaling information ni, si, transmitted via the connection V, are packed into cells according to the ATM communication network. The message information ni of the first to the fifteenth narrowband connections SV1 . . . 15, packed into cells, is hereby respectively allocated to a first to fifteenth virtual channels VC1 . . . 15. This means that virtual channels VC1 . . . 15 are provided for each narrowband connection SV1 . . . 15. These 15 virtual channels VC1 . . . 15 are allocated to a first virtual path VP1. This first virtual path VP1 represents the first partial line bundle TLB1. Analogously to this, the message information ni, packed into cells, of the sixteenth to thirtieth narrowband connections SV16 . . . 30 of the second partial line bundle TLB2 are respectively allocated to virtual channels VC16 . . . 30, which are again combined in a second virtual path VP2. In addition, a signaling unit SU is contained in the first interworking unit IWU1, to which signaling unit the packet-oriented signaling information si of the central character channel CSS are guided. In the signaling unit SU, the incoming signaling information are separated according to partial line bundles, that is, on the basis of the routing information inserted into the respective packets, the incoming signaling information si are checked to see whether they belong to a narrowband connection SV1 . . . 30 of the first or second partial line bundle TLB1, TLB2. Corresponding to the result of the check, the signaling information si are inserted into cells and allocated to a thirty-second [32nd] virtual channel VC32 (represents the first partial line bundle TLB1) or to a thirty-third virtual channel VC33 (corresponds to the second partial line bundle TLB2). The two virtual paths VP1, VP2, including the allocated virtual channels VC1 . . . 30 and the additional virtual channels VC32, VC33, are transmitted via a single physical terminal (not shown) to an ATM communication system ATM-KS of an ATM communication network KN, in which the thirty-second virtual channel VC32 is transmitted via the first virtual path VP1 and the thirty-third virtual channel VC33 is transmitted via the second virtual path VP2. Using the ATM communication system ATM-KS, the message and signaling information ni, si of the first partial line bundle TLB1 is switched to a second interworking unit IWU2 via the first virtual path VP1. The first virtual path, as well as the second and a third (explained below), VP1 . . . 3, are guided via permanent virtual connections, that is, permanent virtual channels. Alternatively, switched permanent virtual connections can be realized. Both permanent connections are installed in the relevant ATM communications systems ATM-KS by means of administrative inputs (not shown). Given a permanent virtual connection, in each ATM communication system ATM-KS the virtual channels VC to be switched are indicated directly in the switching memories, that is, are permanently determined. Given switched permanent virtual connections, the allocation of the virtual channels is determined on the basis of the call number that is individual to the narrowband connection, in particular the call reference number. This means that given switched permanent virtual connections, the required switching-oriented resources in the ATM communication system ATM-KS are first made available upon the presence of cells to be transmitted or, respectively, message and signaling information ni, si to be transmitted.

In the second interworking unit IWU2, the message and signaling information ni, si, packed in cells, of the 15 virtual channels VC1 . . . 15 are converted into PCM-oriented information, that is, unpacked and transmitted to the second communication system KS2 via a connection V via a time division multiplex-oriented information stream with a transmission speed of 2048 kbit/s. In this communication system, the message information ni is allocated to the respective narrowband connections SV . . . 15, and is further switched to communication terminal apparatus (not shown) predetermined by the signaling. In the second communication system KS2, the first 15 narrowband connections SV . . . 15 are likewise allocated to the first partial line bundle TLB1. The additional 15 narrowband connections SV16 . . . 30 are combined into a third virtual path VP3, in the manner of functioning already explained. Both the second and the third virtual path VP2, VP3 are switched to a third communication system KS3, indicated by the designation KS3, using the ATM communication system ATM-KS or, respectively, the ATM communication network. In the second communication network KS2, the first and third partial line bundles TLB1, TLB3 form the line bundle LB.

A signaling unit SU, arranged in the second interworking unit IWU2 and realized according to the first interworking unit IWU1, collects the signaling information si transmitted via the thirty-second virtual channel VC32 and via a thirty-fourth virtual channel VC34 (of the third communication system). It allocates the information to a central character channel CCS, which is guided to the second communication system KS2 via the connection V within the multiplexed information stream. In the reverse direction, the signaling information si, transmitted by the second communication system KS2 via the central signaling channel CCS, is separated according to partial line bundle and respectively allocated to a separate virtual channel VC32, VC34. The thirty-second virtual channel VC32 is allocated to the first virtual path VP1 and the thirty-fourth virtual channel VC34 is allocated to a third virtual path VP3.

The invention is not limited to the particular details of the method depicted and other modifications and applications are contemplated. Certain other changes may be made in the above described method without departing from the true spirit and scope of the invention herein involved. It is intended, therefore, that the subject matter in the above depiction shall be interpreted as illustrative and not in a limiting sense.

What is claimed is:

1. A method for switching narrowband switched connections between time division multiplex communication systems, said connections having time division multiplex-oriented message and signaling information, comprising the steps of:

allocating, in the communication systems, message information to be switched of the narrowband switched connections to partial line bundles, the line bundles being respectively installed between communication systems of a bidirectional line bundle having standardized transmission speed, and combining the signaling information of the narrowband connections in an additional narrowband connection of the line bundle;

conducting the line bundle of the communication systems to an ATM communication network;

allocating respectively message information of a partial line bundle cell-by-cell to virtual channels, which are respectively combined to a path representing a partial line bundle;

separating the combined signaling information according to partial line bundles and respectively allocating the separated signaling information to a relevant virtual path representing a partial line bundle;

unpacking the message information or, respectively, signaling information, transmitted transparently cell-by-cell via the virtual channels of the virtual paths of the ATM communication network and allocating the unpacked information to a respective narrowband connection or, respectively, to an additional narrowband connection of the relevant installed partial line bundle of the line bundle connected respectively to an additional communication system.

2. The method according to claim 1, wherein the message and signaling information are switched via at least one of virtual channels of permanent virtual and switched permanent virtual paths of the ATM communication network.

3. The method according to claim 1, wherein the signaling information concerning a partial line bundle is combined and allocated to a separate virtual channel, which is combined with a virtual path representing the respective partial line bundle.

4. The method according to claim 1, wherein the method further comprises providing an interworking unit in the ATM communication system in which the following steps are performed:

allocating, cell-by-cell, message information of a partial line bundle to virtual channels, which are respectively combined into a path representing a partial line bundle;

representing the separation according to partial line bundles of the combined signaling information, as well as allocation thereof to a relevant virtual path, by a partial line bundle; and unpacking transmitted message information or, respectively, signaling information, and allocating the unpacked information to a respective narrowband connections, or, respectively, additional narrowband connections of the relevant installed partial line bundles of the line bundle connected respectively with an additional communication system.

5. The method according to claim 4, wherein the interworking units are arranged in the terminal area of the ATM communication systems of the ATM communication network.

6. The method according to claim 1, wherein the line bundles of the communication systems have a standardized transmission speed of 1544 kbit/s or 2048 kbit/s, and wherein the transmission speed of the narrowband connections and of the virtual channels is 64 kbit/s, and of the virtual paths is n * 64 kbit/s where n is a whole number.

7. A method for switching narrowband switched connections between time division multiplex communication systems, said connections having time division multiplex-oriented message and signaling information, comprising the steps of:

allocating, in the communication systems, message information to be switched of the narrowband switched connections to partial line bundles, the line bundles being respectively installed between communication systems of a bidirectional line bundle having standardized transmission speed, and combining the signaling information of the narrowband connections in an additional narrowband connection of the line bundle;

conducting the line bundle of the communication systems to an ATM communication network;

allocating respectively message information of a partial line bundle cell-by-cell to virtual channels, which are respectively combined to a path representing a partial line bundle;

separating the combined signaling information according to partial line bundles and respectively allocating the separated signaling information to a virtual path representing a partial line bundle;

switching and transmitting the message and signaling information via virtual channels of virtual paths of the ATM communication network; and unpacking the transmitted message information or, respectively, signaling information, and allocating the unpacked information to a respective narrowband connection or, respectively, to an additional narrowband connection of the relevant installed partial line bundle of the line bundle connected respectively to an additional communication system.

8. The method according to claim 7, wherein the signaling information concerning a partial line bundle is combined and allocated to a separate virtual channel, which is combined with a virtual path representing the respective partial line bundle.

9. The method according to claim 7, wherein the method further comprises providing an interworking unit in the ATM communication system in which the following steps are performed:

allocating, cell-by-cell, message information of a partial line bundle to virtual channels, which are respectively combined into a path representing a partial line bundle;

representing the separation according to partial line bundles of the combined signaling information, as well as allocation thereof to a relevant virtual path, by a partial line bundle; and unpacking transmitted message information or, respectively, signaling information, and allocating the unpacked information to a respective narrowband connections, or, respectively, additional narrowband connections of the relevant installed partial line bundles of the line bundle connected respectively with an additional communication system.

10. The method according to claim 7, wherein the interworking units are arranged in the terminal area of the ATM communication systems of the ATM communication network.

11. The method according to claim 7, wherein the line bundles of the communication systems have a standardized transmission speed of 1544 kbit/s or 2048 kbit/s, and wherein the transmission speed of the narrowband connections and of the virtual channels is 64 kbit/s, and of the virtual paths is n * 64 kbit/s where n is a whole number.

12. A method for switching narrowband switched connections between time division multiplex communication systems, said connections having time division multiplex-oriented message and signaling information, comprising the steps of:

providing an interworking unit in the ATM communication system;

allocating, in the communication systems, message information to be switched of the narrowband switched connections to partial line bundles, the line bundles being respectively installed between communication systems of a bidirectional line bundle having standardized transmission speed, and combining the signaling information of the narrowband connections in an additional narrowband connection of the line bundle;

conducting the line bundle of the communication systems to an ATM communication network;

allocating in the interworking unit, cell-by-cell, message information of a partial line bundle to virtual channels, which are respectively combined into a path representing a partial line bundle;

representing in the interworking unit the separation according to partial line bundles of the combined signaling information, as well as allocation thereof to a relevant virtual path, by a partial line bundle; and unpacking in the interworking unit transmitted message information or, respectively, signaling information, and allocating the unpacked information to a respective narrowband connections, or, respectively, additional narrowband connections of the relevant installed partial line bundles of the line bundle connected respectively with an additional communication system.

13. The method according to claim 12, wherein the interworking units are arranged in the terminal area of the ATM communication systems of the ATM communication network.

14. The method according to claim 12, wherein the line bundles of the communication systems have a standardized transmission speed of 1544 kbit/s or 2048 kbit/s, and wherein the transmission speed of the narrowband connections and of the virtual channels is 64 kbit/s, and of the virtual paths is n * 64 kbit/s where n is a whole number.

15. The method according to claim 12, wherein the message and signaling information are switched via at least one of virtual channels of permanent virtual and switched permanent virtual paths of the ATM communication network.

16. The method according to claim 12, wherein the signaling information concerning a partial line bundle is combined and allocated to a separate virtual channel, which is combined with a virtual path representing the respective partial line bundle.

* * * * *